United States Patent
Lechtenberg

[11] Patent Number: 5,829,714
[45] Date of Patent: Nov. 3, 1998

[54] AEROLIFT MECHANISM

[76] Inventor: William Francis Lechtenberg, P.O. Box 713, Taos Ski Valley, N. Mex. 87525

[21] Appl. No.: 998,702

[22] Filed: Dec. 29, 1997

[51] Int. Cl.$^6$ .................................................... B64C 39/06
[52] U.S. Cl. ........................................ 244/12.2; 244/73 B
[58] Field of Search ..................... 244/13, 12.2, 12.1, 244/23 R, 23 C, 39, 73 B, 73 C

[56] References Cited

U.S. PATENT DOCUMENTS

| | | | |
|---|---|---|---|
| 2,176,542 | 10/1939 | Nicholson | 244/39 |
| 2,402,957 | 7/1946 | Geddes | 244/39 |
| 3,073,551 | 1/1963 | Bowersox | 244/73 B |
| 3,199,809 | 8/1965 | Modesti | 244/12.2 |
| 3,359,678 | 12/1967 | Headrick . | |
| 3,599,902 | 8/1971 | Thomley . | |
| 3,630,470 | 12/1971 | Elliott . | |
| 3,664,611 | 5/1972 | Harris . | |
| 3,697,020 | 10/1972 | Thompson | 244/12.2 |
| 3,724,122 | 4/1973 | Gillespie, Sr. . | |
| 3,785,592 | 1/1974 | Kerruish . | |
| 3,915,411 | 10/1975 | Surbaugh | 244/12.2 |
| 4,202,518 | 5/1980 | Burnham et al. | 244/73 C |
| 4,674,708 | 6/1987 | Del Castillo | 244/12.2 |
| 5,240,204 | 8/1993 | Kunz . | |

FOREIGN PATENT DOCUMENTS

| | | | |
|---|---|---|---|
| 2241160 | 3/1974 | Germany | 244/12.2 |

OTHER PUBLICATIONS

Van Nostrands Scientific Encyclopedia Sixth Edition 1983 Van Nostrand Reinhold Company, Inc. New York, NY. Editor—Douglas M. Considine, P.E. Authors Unknown Fluid Dynamics, Covette Flow Fig. 1 p. 1231.
Fluid Flow, Bernoulli's Law p. 1232.
Fluid Flow (Boundary Layer) pp. 1232–1233.
Fluidics p. 1233 Coanda effect Fig. 2 p. 1234.
The Gale Encyclopedia of Science 1996 Gale Research Detroit, MI Advisory Board Member—David Campbell Head—Dept of Physics V. of Illinois Author Unknown Bernoulli's Principle p. 455.

*Primary Examiner*—Galen L. Barefoot

[57] ABSTRACT

A free movement, lift mechanism employing a spinning disc utilizing Bernoulli's Theorem and the derivative Coanda and Couette effects augmented by centrifugal force. Lift control is provided by variation in rotational velocity of the disc, by variation in the width of a Couette space and by variation in the amount of air entering the Couette space. Strategically placed vanes provide stabilizing control.

3 Claims, 3 Drawing Sheets

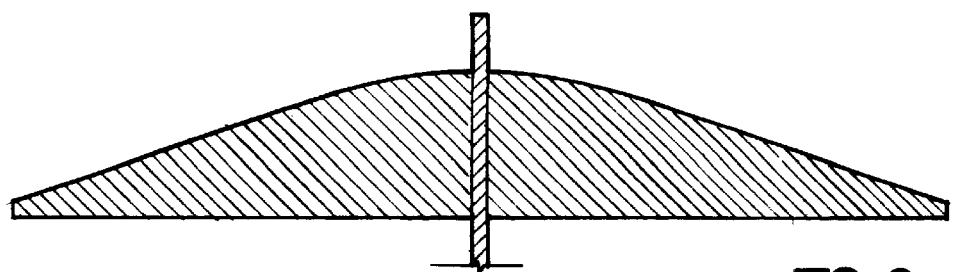
FIG. 3a
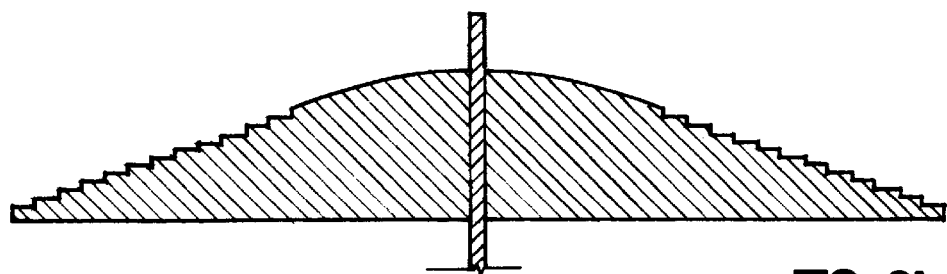
FIG. 3b
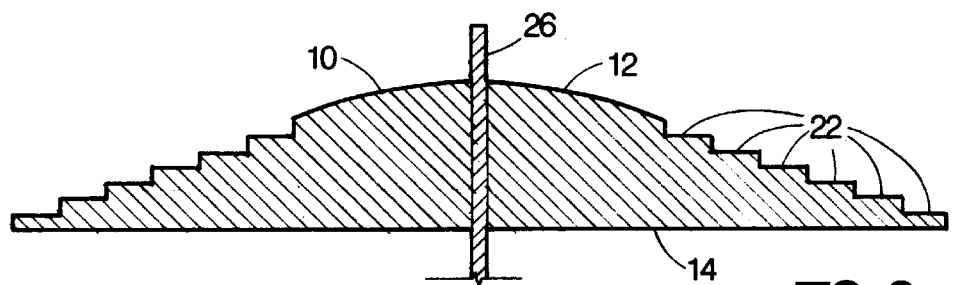
FIG. 3c
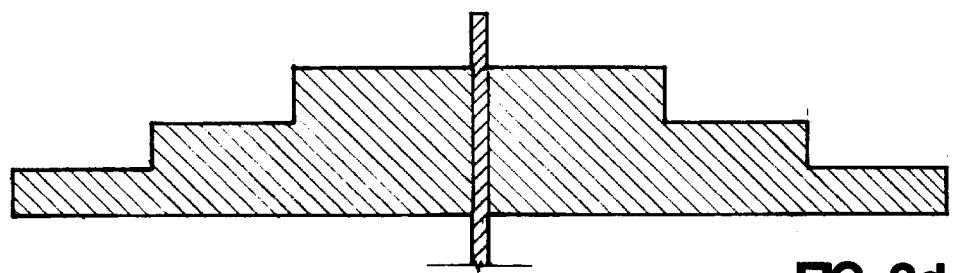
FIG. 3d
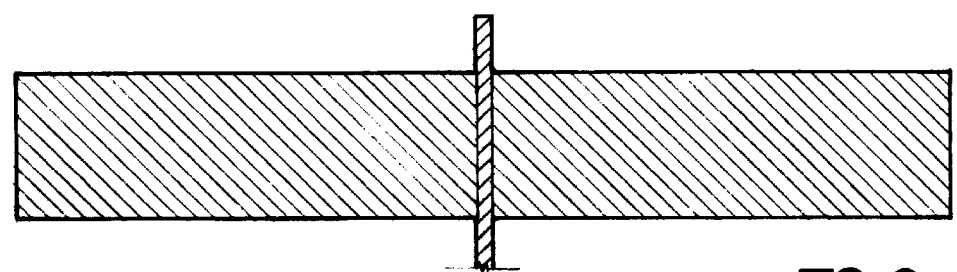
FIG. 3e
FIG. 3

AEROLIFT MECHANISM

BACKGROUND

Vertical lift mechanisms in use today are of the limited horizontal and vertical movement types, such as cranes, derricks and fork-lifts or of the free movement types such as helicopters and assorted VTOL aircraft. These latter types are generally noisy, windy, hard to maintain, difficult to control and not very efficient.

This invention is intended to overcome all of the above listed limitations of both types of vertical lift mechanisms. The operator may ride with it or control it remotely with electric cables or electro-magnetic signals.

Other inventors have attempted to solve these problems with no known commercial success. U.S. Pat. Nos. 3,599,902 3,630,470 3,664,611 3,785,592 and 5,240,204 all approached the problem by generating an air stream by means of propellers or engine exhaust. This stream was then directed at airfoils of various configurations. All of these inventions required numerous complicated parts. Apparently they did not become commercial because they failed to meet enough of their objectives to offset the minimal lift achieved. U.S. Pat. No. 4,202,518 used a spinning disc to provide lift. Again, however, numerous complicated features were required, most of which subtracted from lift rather than adding to lift. This invention is not known to have become commercial.

SUMMARY

It is the object of this invention to be incorporated into the body of a vehicle to provide the lift and translation necessary to transport cargo and people several thousand feet vertically and several miles horizontally.

It is a further object to provide this transport quietly and with a minimum of disturbance to surrounding activities.

It is another object to provide close control of this movement to allow operations in confined areas.

It is an additional object to provide a mechanism of extreme simplicity, with a minimum of moving parts allowing ease in design, manufacture and maintenance at low cost.

These objectives are further explained in the accompanying description and drawings.

DRAWINGS

FIG. 1 Vertical section of complete invention

FIG. 2 Top view of invention with protective mesh removed

FIG. 3 Vertical sections of evolution of disc

3c Preferred embodiment of disc with Coanda steps 3d and 3e Evolution to flat disc 3d and 3a Evolution to airfoil disc

REFERENCE NUMERALS

10 Disc
12 Top surface of disc
14 Under surface of disc
16 Roof of cab
18 Top surface of roof
20 Under surface of roof
22 Coanda steps on top surface of disc
24 Couette space between disc and roof
26 Drive shaft
28 Drive shaft tunnel
30 Motor
32 Adjustable motor mounts
34 Thrust bearings in motor
36 Drive shaft journal type bearings
38 Vertical anti-rotation vanes
40 Horizontal anti-tilt vanes
42 Mesh protective housing
44 Control panel
46 Air ports to Couette space
48 Seat
50 Floor of cab
52 Skid
54 Retractable wheels

DETAILED DESCRIPTION

Figure 1:
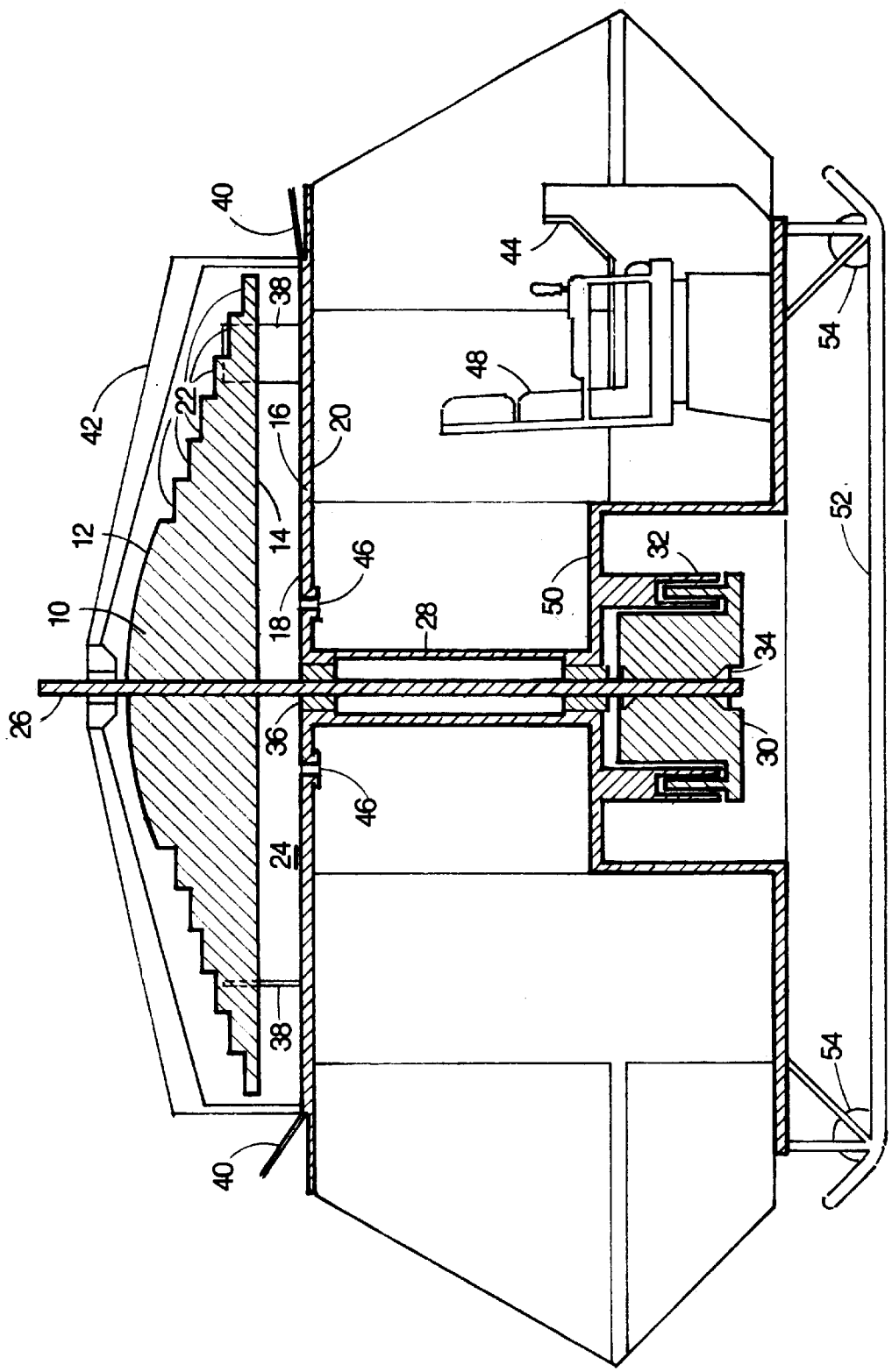

This invention consists of four operational surfaces arranged one above the other with each having variable air pressure on it under individual control of the operator. The top two surfaces are a top surface 12 and an under surface 14 of a rotating disc 10. The bottom two surfaces are a top surface 18 and an under surface 20 of a non-rotating plate serving as a cab roof 16. Said disc 10 is attached securely at its center of rotation to a vertical drive shaft 26 extending upward and downward through two journal type bearing 36. Said drive shaft 26 is rotated by means of a motor 30 mounted on vertically adjustable mounts 32 attached to the underside of cab floor 50. Said motor 30 is equipped with thrust bearings 34. Said drive shaft 26 is encased in a non-rotating tunnel 28.

Control equipment includes vertical anti-rotation vanes 38 and horizontal anti-tilt vanes 40 attached to said top surface 18 of said cab roof 16 around its periphery. Said vanes 38 and 40 and said motor mounts 32 are adjustable by mechanic, electric, hydraulic or pneumatic means selected and installed during manufacture. Additional control is provided by air ports 46 which connect ambient atmospheric air to Couette space 24. A control panel 44 is mounted to cab floor 50.

Auxiliary equipment consists of a mesh protective housing 42 attached to said top surface 18 of said cab roof 16 around its periphery. A seat 48 sits on said cab floor 50. Skid 52 is attached below said cab Floor 50 and is provided with retractable wheels 54.

The preferred embodiment of said disc 10 containing intermediate size Coanda steps 22 is depicted in FIG. 3c. The number, size and texture of Coanda steps 22 will be determined empirically prior to manufacture. FIGS. 3a, 3b, 3d and 3e show the kinship of the preferred embodiment to a flat disc and to an airfoil disc.

HOW IT WORKS

Item: Prior to start-up motor 30 is raised by means of adjustable mounts 32, thereby raising drive shaft 26 and disc 10. Journal type bearings 36 allow this upward movement. This action produces a large gap in Couette space 24. At this time pressures on surfaces 12, 14, 18 and 20 are at ambient atmospheric pressure and no resultant lift is produced.

Item: As motor 30 is powered-up and disc 10 begins to spin the air pressures on surfaces 12 and 14 of disc 10 begin to decrease in the amounts as predicted by Bernoulli's Theorem and the concept of inversion. The pressures on surfaces 18 and 20 of roof 16 remain at ambient atmospheric pressure and no resultant lift is produced.

Item: When disc 10 is rotating at top speed the air molecules close to surfaces 12 and 14 of disc 10 will begin to move as per Bernoulli entrainment. This air will be thrown out horizontally due to centrifugal force. This lateral movement of air across Coanda steps 22 will produce a partial vacuum in each of the steps 22. In addition, centrifugal force will eject air outward from each of the Coanda steps 22. This combination will produce significant vacuum in each of the steps 22. At this stage of the operation there is an imbalance in the pressures on surfaces 12 and 14 of disc 10 providing an upward lift.

Item: As motor 30 is lowered by means of adjustable mounts 32 disc 10 will lower toward cab roof 16. This decreases the gap in Couette space 24 with the result that the air in the gap will act as predicted by the Couette effect. The air will then be thrown outward by centrifugal force producing a partial vacuum in the gap. At some point the air pressures on surface 14 of disc 10 and surface 18 of roof 16 will tend to equalize. This will cancel the negative lift on surface 14 of disc 10 thereby providing some additional resultant lift. The final lift will be the difference between ambient atmospheric pressure on surface 20 of roof 16 minus pressure on surface 12 of disc 10.

Item: Lift can be varied three ways: changing the speed of rotation of disc 10, changing the width of the gap in Couette space 24 or introducing air into Couette space 24 by means of air ports 46.

Item: The air shed laterally off surface 12 of disc 10 will impinge on vertical vanes 38 which can be adjusted to cause the vehicle to rotate in a desired direction.

Item: The air shed laterally off surface 12 of disc 10 will impinge on horizontal vanes 40 which can be adjusted to cause the vehicle to tilt in a desired direction. This will provide lateral translation.

Figure 2:
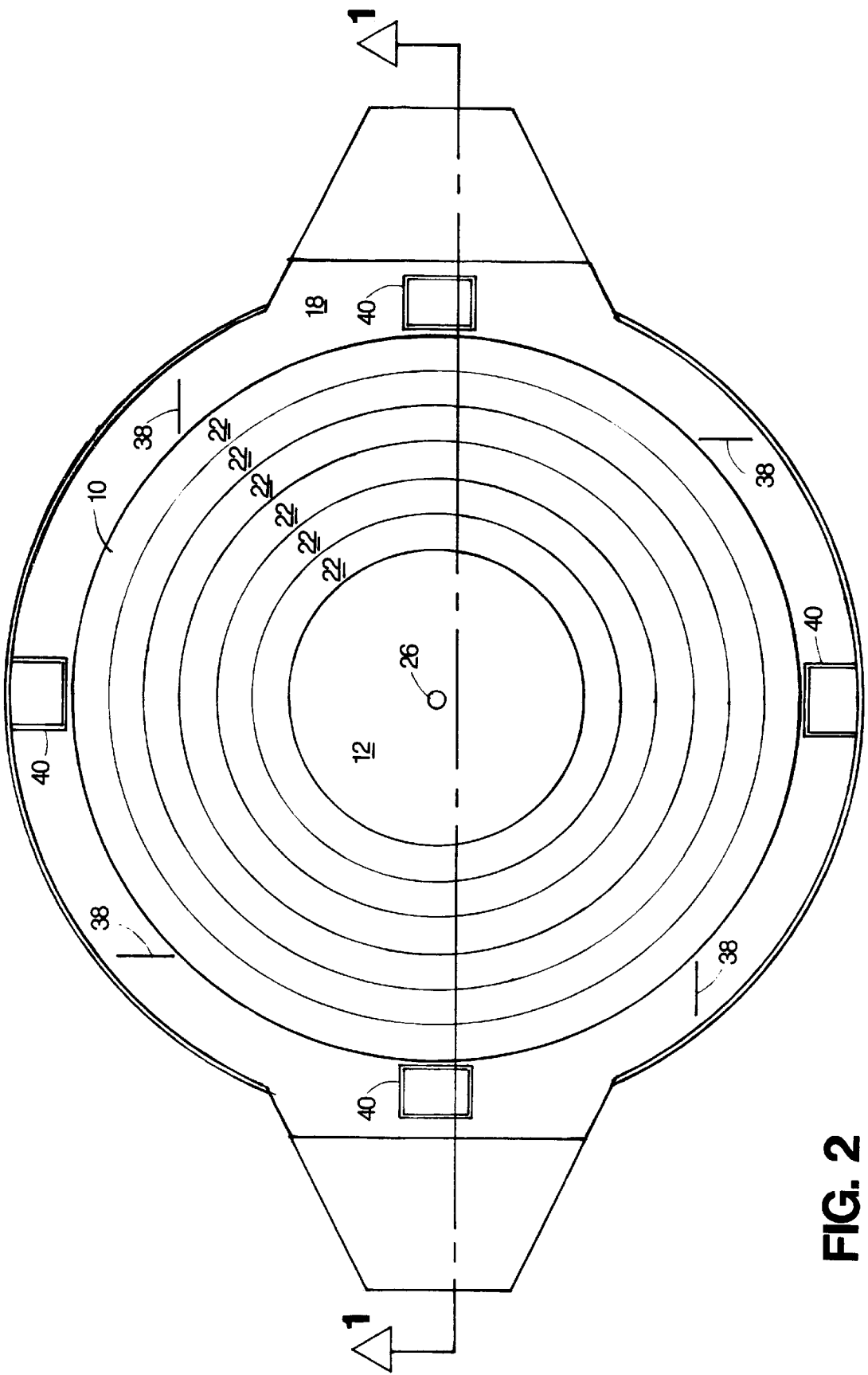

The body of the vehicle in this invention can have any of several configurations. One would be an enclosed cab as depicted in FIGS. 1 and 2. This would be suitable for lifting and transporting people and loose or weather vulnerable cargo. Another would be merely an open cage from which cargo slings or hooks are suspended. The operator can either ride in the vehicle or control remotely by means of electric cables or electromagnetic signals selected and installed at the time of manufacture.

I claim:

1. An airlift mechanism consisting of a spinning disc oriented in an approximately horizontal plane, having a flat undersurface and a convex top surface upon which is inscribed a series of circular steps concentric about a vertical shaft, said disc being firmly attached at its center of rotation to said shaft which extends downward through a sealed bearing in a flat plate, the top surface of said plate being oriented parallel to the undersurface of said disc thereby forming a gap between; said shaft is rotated by a motor mounted below said plate.

2. A mechanism as in claim 1, wherein said shaft and said disc are provided with means to be moved vertically relative to said plate thereby changing the width of said gap.

3. A mechanism as in claim 1, wherein said plate is pierced with a multiplicity of vertical openings connecting ambient atmospheric air below said plate to said gap above, said openings being provided with means to control their cross-sectional size.

\* \* \* \* \*